(12) United States Patent
Sobue

(10) Patent No.: US 7,742,189 B2
(45) Date of Patent: Jun. 22, 2010

(54) OPTICAL SCANNING APPARATUS

(75) Inventor: Fumitaka Sobue, Toride (JP)

(73) Assignee: Canon Kabushiki Kaisha (JP)

( * ) Notice: Subject to any disclaimer, the term of this patent is extended or adjusted under 35 U.S.C. 154(b) by 975 days.

(21) Appl. No.: 11/466,089

(22) Filed: Aug. 21, 2006

(65) Prior Publication Data

US 2007/0053011 A1 Mar. 8, 2007

(30) Foreign Application Priority Data

Sep. 2, 2005 (JP) ............................. 2005-255621

(51) Int. Cl.
- B41J 2/455 (2006.01)
- G02B 26/10 (2006.01)
- G02B 26/08 (2006.01)
- G06K 15/12 (2006.01)
- G06T 5/00 (2006.01)

(52) U.S. Cl. ..................... 358/1.7; 358/3.26; 359/216.1; 359/217.1; 359/226.2; 359/213.1; 359/212.1; 347/233

(58) Field of Classification Search ................. 347/130, 347/225, 232, 233, 241; 348/67, 68, 206, 348/208.11, 209.99; 359/17, 19, 211.1, 211.2, 359/211.3, 211.4, 211.5, 212.2, 213.1, 216.1, 359/225.1, 218.1, 219.1, 217.1, 221.1, 226.2, 359/238, 436, 438, 439, 440, 441; 358/1.2, 358/1.6, 1.7, 3.26, 3.28, 504, 505, 509, 471, 358/474, 475, 480, 481, 484

See application file for complete search history.

(56) References Cited

U.S. PATENT DOCUMENTS

| 4,829,175 A | 5/1989 | Goto et al. |
| 4,841,135 A | 6/1989 | Goto et al. |
| 5,883,657 A | 3/1999 | Minakuchi |

(Continued)

FOREIGN PATENT DOCUMENTS

CN 1206855 A 2/1999

(Continued)

OTHER PUBLICATIONS

Office Action issued in corresponding Chinese application No: 2006101277286, issued on Aug. 31, 2007.

(Continued)

*Primary Examiner*—Jerome Grant, II
(74) *Attorney, Agent, or Firm*—Rossi, Kimms & McDowell LLP

(57) ABSTRACT

Data concerning misalignment of beams is measured and held in an optical scanning apparatus before the optical scanning apparatus is incorporated in an image forming apparatus. The optical scanning apparatus includes a light source for emitting multiple beams, an optical lens for converting the multiple beams to parallel lights and a rotating polygon mirror for rotary-deflecting the multiple beams. Furthermore, the measurement apparatus measures main scanning direction misalignment among the multiple beams on a photosensitive member provided for the image forming apparatus, which has been determined by detecting the multiple beams from the rotating polygon mirror (and an fθ lens). The optical scanning apparatus includes a holding unit for holding the data concerning misalignment. The image forming apparatus in which the optical scanning apparatus is incorporated corrects the misalignment with the use of the data concerning misalignment inputted directly or indirectly from the holding unit.

20 Claims, 15 Drawing Sheets

U.S. PATENT DOCUMENTS

| | | |
|---|---|---|
| 6,181,415 B1 | 1/2001 | Kanazawa et al. |
| 6,301,021 B1 | 10/2001 | Ohnuma |
| 6,933,960 B1 * | 8/2005 | Chee et al. .................. 347/257 |
| 7,016,380 B2 * | 3/2006 | Shim ........................... 372/24 |
| 7,333,254 B2 * | 2/2008 | Amada et al. ............ 359/196.1 |
| 7,450,274 B2 * | 11/2008 | Itabashi et al. .............. 358/474 |
| 2002/0135822 A1 | 9/2002 | Morita et al. |
| 2004/0036936 A1 * | 2/2004 | Nakajima et al. ........... 359/204 |
| 2004/0125193 A1 * | 7/2004 | Kubo ......................... 347/233 |
| 2004/0160516 A1 * | 8/2004 | Ford ........................... 348/203 |
| 2005/0001895 A1 | 1/2005 | Uemura et al. |
| 2005/0024479 A1 * | 2/2005 | Itabashi et al. .............. 347/243 |
| 2005/0077360 A1 * | 4/2005 | Ito et al. ..................... 235/454 |
| 2005/0201251 A1 * | 9/2005 | Nakatsu ................. 369/112.24 |
| 2005/0212902 A1 | 9/2005 | Cook et al. |
| 2006/0023231 A1 * | 2/2006 | Ohmiya ...................... 358/1.7 |
| 2006/0158711 A1 * | 7/2006 | Imai et al. ................... 359/204 |
| 2006/0176409 A1 * | 8/2006 | Van Amstel ................ 348/792 |
| 2006/0237638 A1 * | 10/2006 | Lee ............................. 250/234 |
| 2006/0262373 A1 * | 11/2006 | Oda et al. ................... 359/205 |
| 2007/0081220 A1 * | 4/2007 | Yokoyama et al. .......... 359/216 |
| 2007/0115339 A1 * | 5/2007 | Matsuzaki et al. .......... 347/118 |

FOREIGN PATENT DOCUMENTS

| | | |
|---|---|---|
| CN | 1578375 A | 2/2005 |
| JP | 9-96771 A | 4/1997 |
| JP | 09-096771 A | 4/1997 |
| JP | 2001-228417 A | 8/2001 |

OTHER PUBLICATIONS

Relevant portion of European Search Report of corresponding Patent Application No. 06119101.1-2217 with date Nov. 3, 2006.

* cited by examiner

OPTICAL SCANNING APPARATUS

BACKGROUND OF THE INVENTION

1. Field of the Invention

This invention relates to an optical scanning apparatus, and more particularly to an optical scanning apparatus to be incorporated in an image forming apparatus.

2. Description of the Related Art

In general, in an image forming apparatus such as a laser beam printer, scanning of laser beams is realized by causing a rotating polygon mirror to reflect the laser beams irradiated from a laser diode.

Recently, high-speed print and high image quality are strongly demanded. In order to realize this demand, a multi-beam method capable of printing out multiple lines by one scanning with the use of multiple beams is increasingly becoming mainstream.

In the multi-beam method, the main scanning position of a beam spot on a photosensitive member may be misaligned from an ideal position due to various reasons.

According to Japanese Patent Laid-Open No. 09-96771, a method is proposed in which an image writing position is determined by detecting synchronization signals corresponding to respective beams with one photo detector. A technique obtained by further improving this technique is also proposed (Japanese Patent Laid-Open No. 2001-228417). According to Japanese Patent Laid-Open No. 2001-228417, a method is proposed in which a writing position is determined based on position data corresponding to misalignment from a virtual straight line. This virtual straight line is specified by a cutout formed in the stem of a laser diode.

SUMMARY OF THE INVENTION

However, according to Japanese Patent Laid-Open No. 2001-228417, misalignment is corrected without consideration of existence of an fθ lens or a polygon mirror (rotating polygon mirror). Therefore, it is difficult to accurately correct any deviation of a main scanning position of a beam spot on a photosensitive member. In general, multiple beams emitted from a laser diode have slightly different wavelengths, and the refraction factor of a lens has wavelength dependence. Accordingly, when the beams having different wavelengths pass through a lens, the emission positions thereof are relatively misaligned because of the difference among the refraction factors. Furthermore, the main scanning direction magnification is not constant among the beams because of the difference among the refraction factors. The magnification may change due to a mechanical alignment error of the mirror or the lens. Therefore, it is necessary to perform light emission control in consideration of data concerning the magnification.

It is also conceivable to measure misalignment on an image forming apparatus. In this case, however, a measurement apparatus must be mounted on all image forming apparatuses, which is a disadvantage from a cost viewpoint.

In consideration of the above situation, the object of the present invention is to solve at least one of such and other problems. The other problems will be understood from reading the entire specification.

According to the present invention, data concerning beam misalignment is obtained and held by an optical scanning apparatus before the optical scanning apparatus is incorporated in an image forming apparatus. The optical scanning apparatus includes a light source for emitting multiple beams, an optical lens for converting the multiple beams to parallel lights and a rotating polygon mirror for rotary-deflecting the multiple beams. Furthermore, the measurement apparatus measures the main scanning direction misalignment among the multiple beams on a photosensitive member provided for the image forming apparatus, which has been determined by detecting the multiple beams from the rotating polygon mirror and the fθ lens. The optical scanning apparatus includes a holding unit for holding data concerning the misalignment. The image forming apparatus in which the optical scanning apparatus is incorporated corrects the misalignment with the use of the data concerning the misalignment inputted directly or indirectly from the holding unit.

According to the present invention, an external measurement apparatus is capable of measuring data concerning misalignment as an almost complete optical scanning apparatus. Therefore, it is possible to realize light emission control in sufficient consideration of errors of an optical system. That is, the present invention is capable of correcting misalignment with a higher accuracy than a conventional system in which laser beams having passed from a laser diode to a collimator lens are measured. Furthermore, according to the present invention, the amount of misalignment is measured and data concerning the misalignment (such as correction values) are obtained by the measurement apparatus at the factory. Accordingly, there is also an advantage that it is not necessary to provide a mechanism for measuring the amount of misalignment for all image forming apparatuses. Furthermore, since the image forming apparatus does not measure the amount of misalignment, down time can be reduced.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

Figure 1:
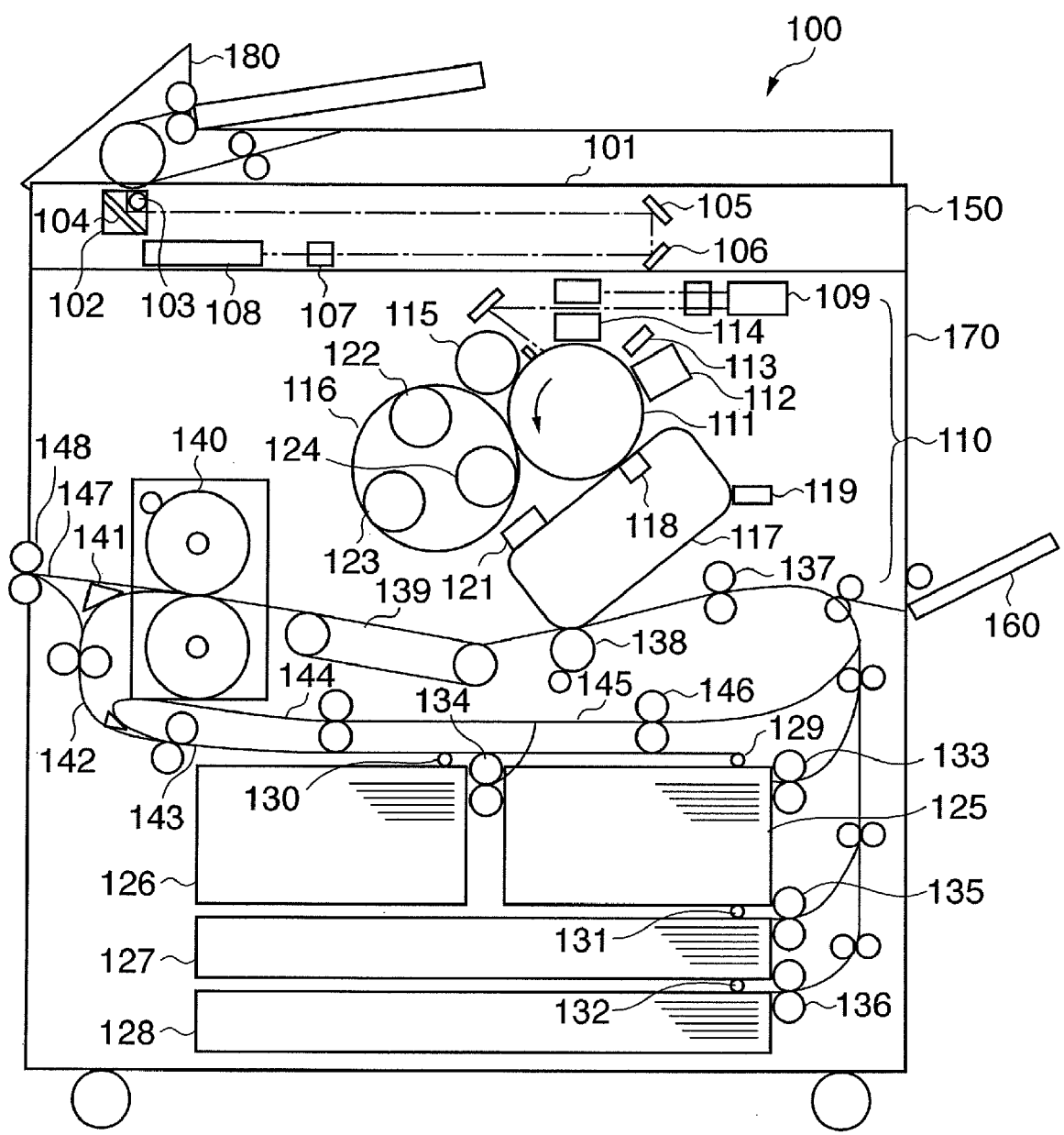
FIG. 1 is a diagram showing the schematic internal structure of the image forming apparatus.

Embodiments of the present invention will be described in detail with reference to drawings. First, the entire configuration of an image forming apparatus according to the present example will be described. FIG. 1 shows a diagram showing a schematic internal structure of the image forming apparatus. A digital color image reader unit (hereinafter referred to as "a reader unit") 150 is provided at the upper part of the case of the image forming apparatus 100. A digital color image printer unit (hereinafter referred to as "a printer unit") 170 is provided at the lower part of the case. A document feeder 180 is provided at the top of the reader unit 150. The image forming apparatus 100 is configured, for example, as a color copying machine having an image reading function and an image forming function.

A post-processing device is added to the image forming apparatus 100 to execute post-processing for recording material on which image forming has been finished. For example, punch processing for punching holes on recording material, stapling processing for binding sheets of recording material, bookbinding processing for binding multiple sheets of recording material and attaching a cover sheet thereto, and the like are executed by the post-processing device.

The image forming apparatus 100 may send and receive data to and from an external apparatus (such as a host computer). For example, the image forming apparatus 100 receives a print job sent from the external apparatus and executes image forming.

The reader unit 150 is provided with a document table glass 101, a scanner unit 102, a scanning mirror 105, a scanning mirror 106, a lens 107, a full-color image sensor unit 108 and the like. The scanner unit 102 has a document-illuminating lamp 103 and a scanning mirror 104.

The document table glass 101 is used as a table on which a document fed by the document feeder 180 or a document set manually is placed. The scanner unit 102 is driven by a motor (not shown) and performs reciprocation scanning in a predetermined direction. The document-illuminating lamp 103 is a light source for emitting light to be applied to a document. A reflected light image of light emitted to a document by the document-illuminating lamp 103 passes through the lens 107 via the scanning mirrors 104 to 106. Furthermore, the reflected light image is formed on a CCD sensor in the full-color image sensor unit 108 which is formed integrally with an RGB three-color separation filter. In this way, an analog signal of a color-separated image is obtained. At a CCD 201 to be described later, this analog signal is digitalized after being amplified by an amplification circuit (not shown).

The printer unit 170 is provided with an image forming unit 110. The image forming unit 110 is provided with an exposure control unit 109, a photosensitive member drum 111, a cleaning device 112, a pre-exposure lamp 113 and a primary charger 114. Furthermore, the image forming unit 110 is also provided with a black color development device 115, a rotary color development device 116, an intermediate transfer belt 117, a primary transfer charger 118 and a cleaning device 121.

The exposure control unit 109 is provided with a semiconductor laser source, which is a beam generation unit, a polygon scanner (see FIG. 3) and the like. The semiconductor laser source generates a laser beam (hereinafter referred to as a beam) modulated based on an image signal. This image signal is converted to an electrical signal by the color image sensor unit 108, and predetermined image processing is performed prior to this step. The polygon scanner emits a beam to the photosensitive member drum 111, which is an image supporting member. The configuration of the exposure control unit 109 will be described later in more detail with reference to FIG. 3.

The photosensitive member drum 111 is driven to rotate clockwise in the figure by a motor (not shown). The electricity of the photosensitive member drum 111 is removed by the pre-exposure lamp 113, and the photosensitive member drum 111 is uniformly charged to a predetermined potential by the primary charger 114. After that, beams are emitted to the surface of the photosensitive member drum 111 by the exposure control unit 109, so that an electrostatic latent image is formed thereon. By operating a predetermined developer to develop this electrostatic latent image, a toner image is formed on the photosensitive member drum 111. This photosensitive member drum 111 has such a property that toner does not adhere to a part where beams have been irradiated on while toner adheres to a part where beams have not been irradiated. That is, the higher the beam emission intensity is, the lower the density of toner is. On the contrary, the lower the beam emission intensity is, the higher the density of toner is.

The rotary color development device 116 is configured by developers 122 to 124 corresponding to yellow, magenta and cyan, respectively. Processing for developing a color image is performed by rotating the rotary color development device 116 by a motor (not shown) and selectively putting a predetermined developer, among the developers 122 to 124 correspond to respective separated colors, close to the photosensitive member drum 111. Subsequently, the black color development device 115 arranged close to the photosensitive member drum 111 is used to develop black. Meanwhile, processing for developing a black-and-white image is performed only with the black color development device 115.

The toner image developed on the photosensitive member drum 111 is primarily transferred to the intermediate transfer belt 117 by a high voltage applied by the primary transfer charger 118. In the case of forming a color image, toner images of four colors are primarily transferred to the intermediate transfer belt 117, being overlapped with one another. Meanwhile, in the case of forming a black-and-white image, only a black toner image is primarily transferred to the intermediate transfer belt 117. When the primary transfer ends, toner remaining on the surface of the photosensitive member drum 111 is cleaned by a blade (not shown) provided for the cleaning device 112.

The printer unit 170 is further provided with a resist roller 137, a secondary transfer roller 138, a conveyor belt 139, a heat roller fuser (hereinafter referred to as a fuser) 140 and a paper discharge flapper 141. Further, the printer unit 170 is also provided with a right cassette deck 125, a left cassette deck 126, an upper-stage cassette deck 127 and a lower-stage cassette deck 128. The printer unit 170 is also provided with a conveyor path 147, a conveyor path 142, a reversing path 143, a lower conveyor path 144, a paper re-feed path 145, a paper re-feed roller 146, a discharge roller 148, a manual paper feed tray 160 and the like.

In each of the cassette decks 125 to 128, there is stored recording material onto which a toner image formed on the intermediate transfer belt 117 at the image forming unit 110 is to be secondary transferred. The recording material stored in the right cassette deck 125 is fed by a pickup roller 129 and a paper feed roller 133 and conveyed by the resist roller 137 to a secondary transfer position where the toner image on the intermediate transfer belt 117 is to be transferred. Similarly, the recording material in the left cassette deck 126 is fed by a pickup roller 130 and a paper feed roller 134. The recording material in the upper-stage cassette deck 127 is fed by a pickup roller 131 and a paper feed roller 135. The recording material in the lower-stage cassette deck 128 is fed by a pickup roller 132 and a paper feed roller 136. Each of such recording material is conveyed to the secondary transfer position by the resist roller 137. In the case of manual paper feeding, the manual paper feed tray 160 is used.

The recording material conveyed to the position of the resist roller 137 from any of the cassette decks 125 to 128 is further conveyed to the position of the secondary transfer roller 138, which is the secondary transfer position. Here, secondary transfer is performed for the recording material via the secondary transfer roller 138. After the secondary transfer ends, toner remaining on the intermediate transfer belt 117 is cleaned with a blade (not shown) provided in the cleaning device 121.

In this example, it is possible to arbitrarily adjust a gap between the intermediate transfer belt 117 and the secondary transfer roller 138 by causing an eccentric cam (not shown) to operate at a desired time. For example, in the case of forming a color image, a gap is provided when toner images of multiple colors are formed on the intermediate transfer belt 117, being overlapped with one another, and the gap is eliminated when the toner images are transferred to the recording material. During stand-by condition or when power is off, a gap is also provided.

The recording material for which the secondary transfer has ended passes through the secondary transfer roller 138, and then is conveyed by the conveyor belt 139 and arrives at the fuser 140. The toner transferred onto the recording material is pressurized and heated by the fuser 140 and thereby fused onto the recording material. After that, the recording material is conveyed through the conveyor path 147 and discharged by the discharge roller 148 to a recording material discharge unit (not shown) provided at the exterior of the image forming apparatus 100.

The paper discharge flapper 141 switches the discharge destination of the recording material fused with toner to the conveyor path 142 or to the discharge roller 148. In the case of forming an image on one side of the recording material, the paper discharge flapper 141 is set on the discharge roller 148 side. In the case of forming images on both sides of the recording material, the paper discharge flapper 141 is set on the conveyor path 142 side. The recording material conveyed by the conveyor path 142 is conveyed to the lower conveyor path 144 via the reversing path 143 and guided to the paper re-feed path 145. By passing through the reversing path 143 and the lower conveyor path 144, the recording material is reversed. In the case of discharging recording material from the image forming apparatus 100 in a reversal condition, the paper discharge flapper 141 is set on the conveyor path 142 side so that the recording material is drawn into the reversing path 143, and then the reversing roller is reversely rotated to convey the recording material to the discharge roller 148.

The document feeder 180 is provided with a document loading unit where a bundle of documents to be copied is loaded, a feeding mechanism for feeding documents one by one from the bundle of documents loaded on the document loading unit, and the like, and they are used to automatically exchange a document to be copied.

Figure 2:
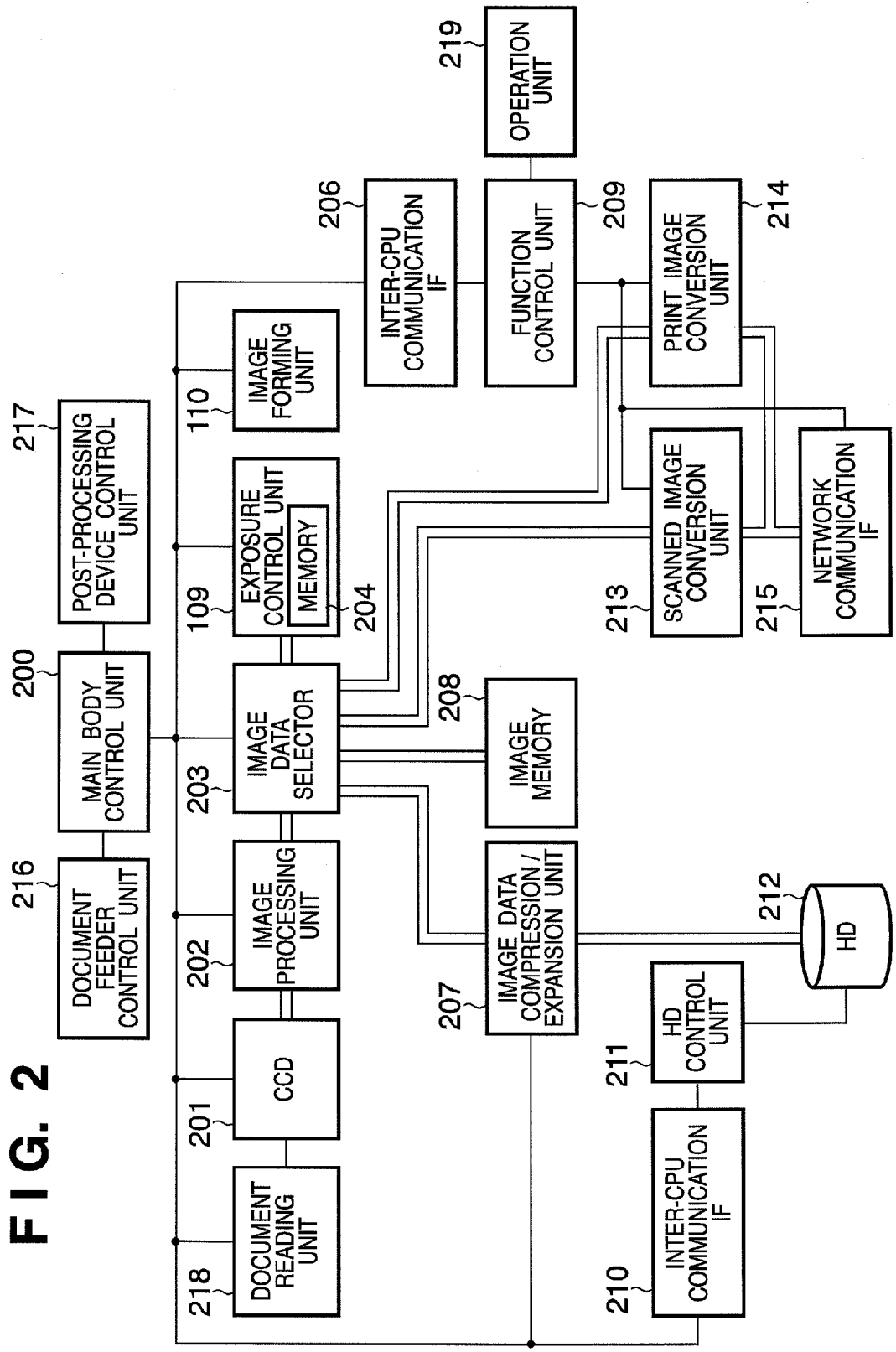
FIG. 2 is a block diagram showing the configuration example of a control circuit of the image forming apparatus 100.

FIG. 2 is a block diagram showing a configuration example of a control circuit of the image forming apparatus according to the execution example. The control circuit of the image forming apparatus 100 is provided with a main body control unit 200, the CCD 201, an image processing unit 202, an image data selector 203, the exposure control unit 109 and the image forming unit 110. The exposure control unit 109 may be provided with a memory 204. The memory 204 functions as a holding unit for holding data concerning misalignment (such as correction values). If an operation unit 219 is provided with a barcode reader, the memory 204 may be omitted. If the content of a barcode can be inputted from the operation unit 219, the memory 204 may also be omitted.

Furthermore, the control circuit is also provided with an inter-CPU communication interface (hereinafter referred to as an IF) unit 206, an image data compression/expansion unit 207, an image memory 208, a function control unit 209 and an inter-CPU communication IF unit 210, an HD (hard disk) control unit 211, an HD drive 212, a scanned image conversion unit 213, a print image conversion unit 214, a network communication IF unit 215, a document feeder control unit 216, a post-processing device control unit 217, a document reading unit 218, and the operation unit 219.

The main body control unit 200 performs drive control of the reader unit 150 constituting the image forming apparatus 100, an image forming unit 110 of the printer unit 170 and the like. The main body control unit 200 includes a CPU, a RAM which provides a work area for the CPU, and a RON in which a control program to be executed by the CPU is stored (not shown).

In the ROM, there are stored control programs for performing overall control of respective units of the image forming apparatus 100. Specifically, in the ROM, there is stored a control program for converting image data read from a document by the CCD 201 to predetermined image data with the use of the image processing unit 202. In the ROM, there is also stored a control program for switching the destination to which image data received by the image data selector 203 is to be sent. As the sending destination, the exposure control unit 109, the image data compression/expansion unit 207, the image memory 208, the function control unit 209 and the like are included. In the ROM, there may be stored a control program for feeding a document with the use of the document feeder 180 controlled by the document feeder control unit 216 or a control program for executing a predetermined mode set in the post-processing device control unit 217.

The CCD 201 forms the signal processing unit of the color image sensor unit 108 provided for the reader unit 150. The CCD 201 catches light reflected from a document, photoelectrically converts it, and then outputs image data obtained by the photoelectrical conversion. The image processing unit 202 performs predetermined image processing for the image data outputted by the CCD 201. The predetermined image processing is processing corresponding to an image processing mode set via the operation unit 219.

The image data selector 203 is connected to the image processing unit 202, the exposure control unit 109, the image data compression/expansion unit 207, the image memory 208, the scanned image conversion unit 213 and the print image conversion unit 214 via an image data bus. The image data selector 203 receives control information from the main body control unit 200 via the image data bus and determines the direction in which image data flows based on the received control information. The exposure control unit 109 is an optical scanning apparatus for performing exposure with beams for the photosensitive member drum 111 provided for the image forming unit 110.

The inter-CPU communication IF unit 206 is an interface for sending and receiving control information between the main body control unit 200 and the function control unit 209. The image data compression/expansion unit 207 compresses image data outputted from the image data selector 203 when accumulating the image data in the HDD 212 which is a high-capacity non-volatile memory. The image data compression/expansion unit 207 expands image data stored in the HDD 212 when transferring the image data to the image data selector 203.

The image memory 208 is a memory for temporarily storing image data sent by the image data selector 203. The image data stored in the image memory 208 is sent to the image data selector 203 as required. The image memory 208 is configured by a volatile memory. The function control unit 209 communicates with the main body control unit 200 and sends image data control information received from the main body control unit 200 to the scanned image conversion unit 213 and the print image conversion unit 214. As the image data control information, control information for sending out image data from either the image data selector 203 or the print image conversion unit 214 to the scanned image conversion unit 213 or the image data selector 203, respectively, is conceivable.

The print image conversion unit 214 receives print image data from the network communication IF unit 215, performs predetermined conversion processing for the received image data, and sends the image data for which the conversion processing has been performed to the image data selector 203. The function control unit 209 sends control information inputted via the operation unit 219 to the main body control unit 200 via the inter-CPU communication IF unit 206.

The inter-CPU communication IF unit 210 is an interface for sending and receiving control information about image data stored in the HDD 212, between the HD control unit 211 and the main body control unit 200. The HD control unit 211 controls the HDD 212 so that the HDD 212 stores image data sent by the image data compression/expansion unit 207. The HD control unit 211 also controls the HDD 212 so that image data stored in the HDD 212 is read, and the read image data is sent to the image data compression/expansion unit 207. Control information required for the HD control unit 211 to control the HDD 212 is received from the main body control unit 200 via the inter-CPU communication IF unit 210. The HDD 212 is configured by a non-volatile memory.

The scanned image conversion unit 213 converts image data sent by the image data selector 203 to image data described in PDL (Page Description Language). Furthermore, the converted image data is transferred to a host computer (not shown) connected to the image forming apparatus 100 via the network communication IF unit 215. The host computer is capable of processing image data described in PDL. The scanned image conversion unit 213 changes the PDL image data to image data in a format which enables the image forming unit 110 to form and output an image. This conversion process by the scanned image conversion unit 213 is performed based on the control by the main body control unit 200.

The network communication IF unit 215 connects the image forming apparatus 100 to a network. The network communication IF unit 215 sends and receives image data or control information to and from equipment (for example, a computer) connected to the network based on a predetermined protocol. The document feeder control unit 216 controls the operation of the document feeder 180 based on control information sent by the main body control unit 200. The post-processing device control unit 217 controls the operation of a post-processing device (not shown) based on control information sent by the main body control unit 200.

The document reading unit 218 controls a scanner unit driving device (not shown) based on control information sent by the main body control unit 200. The scanner unit driving device drives the scanner unit 102.

The operation unit 219 is used when a user inputs information into the image forming apparatus 100. The operation condition of the image forming apparatus 100 is shown to the user via a display unit provided for the operation unit 219. Key information inputted via a key provided for the operation unit 219 is notified to the function control unit 209. The function control unit 209 analyzes the command of the key information and sends the analyzed command to the main body control unit 200 via the inter-CPU communication IF unit 206. Thereby, the control information inputted by the user is notified to the main body control unit 200.

Figure 3:
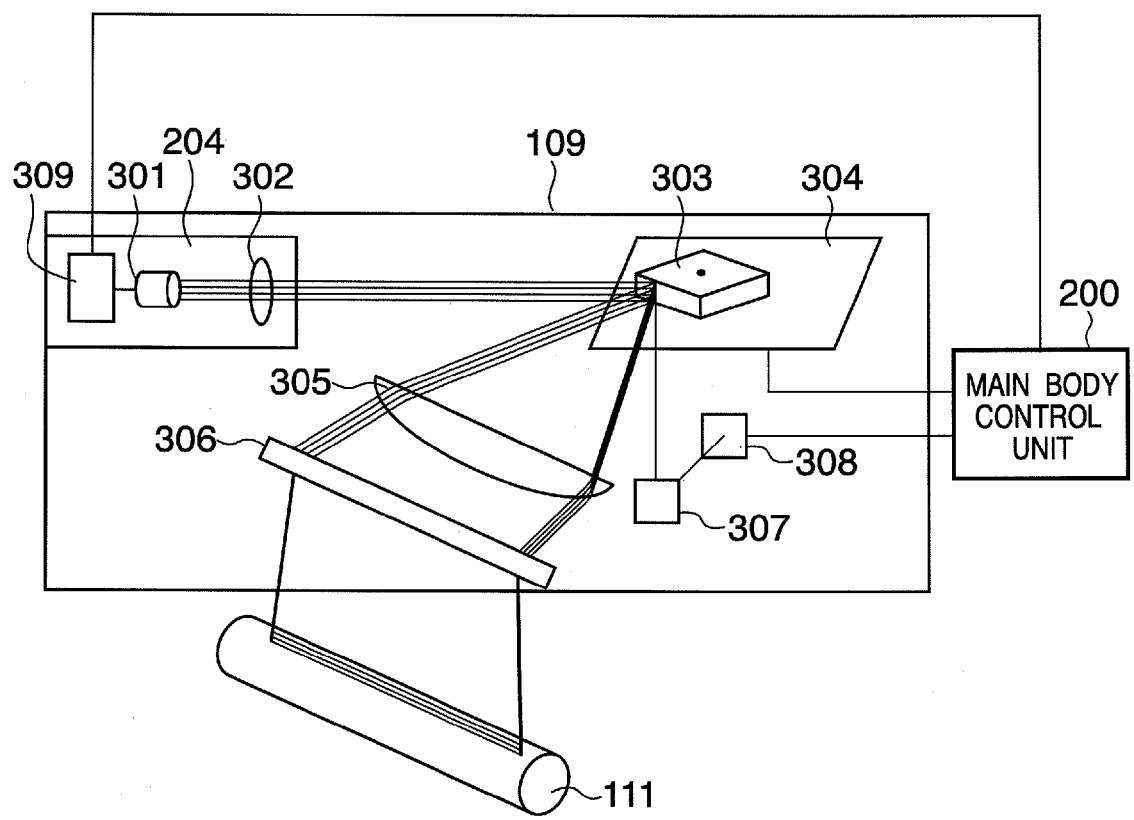
FIG. 3 is a schematic diagram showing the detailed configuration of an exposure control unit of the image forming apparatus.

FIG. 3 is a schematic diagram showing the detailed configuration of the exposure control unit of the image forming apparatus. The exposure control unit 109 has a polygon mirror 303, a polygon drive motor 304, an fθ lens 305, a reflex mirror 306, a reflection mirror 307 and a beam detection unit 308. The exposure control unit 109 has a laser driving unit 309, a semiconductor laser source 301 and a collimator lens 302.

The semiconductor laser source 301 is driven by the laser driving unit 309 to generate and emit a beam. The collimator lens 302 converts the beam emitted from the semiconductor laser source 301 to a parallel light. The polygon mirror 303 is a polyhedral mirror provided with multiple mirror surfaces for reflecting a beam in a horizontal direction to emit it to the photosensitive member drum 111. The polygon drive motor 304 rotates the polygon mirror 303. The fθ lens 305 forms image from the beam reflected by the polygon mirror 303. The reflex mirror 306 guides the beam which has passed through the fθ lens 305 onto the surface of the photosensitive member drum 111. The reflection mirror 307 is a mirror for detecting a beam.

The beam detection unit 308 detects the beam reflected by the reflection mirror 307 and outputs a beam detection signal to the main body control unit 200. The main body control unit 200 detects the period of the beam detection signal and outputs an acceleration signal or a deceleration signal to the polygon drive motor 304 so that the period is adapted to a predetermined value. The polygon drive motor 304 drives the polygon mirror 303 based on the control by the main body control unit 200. When an image is formed, the timing of an image writing is determined with a pattern detected by the beam detection unit 308 used as a reference.

Figure 4:
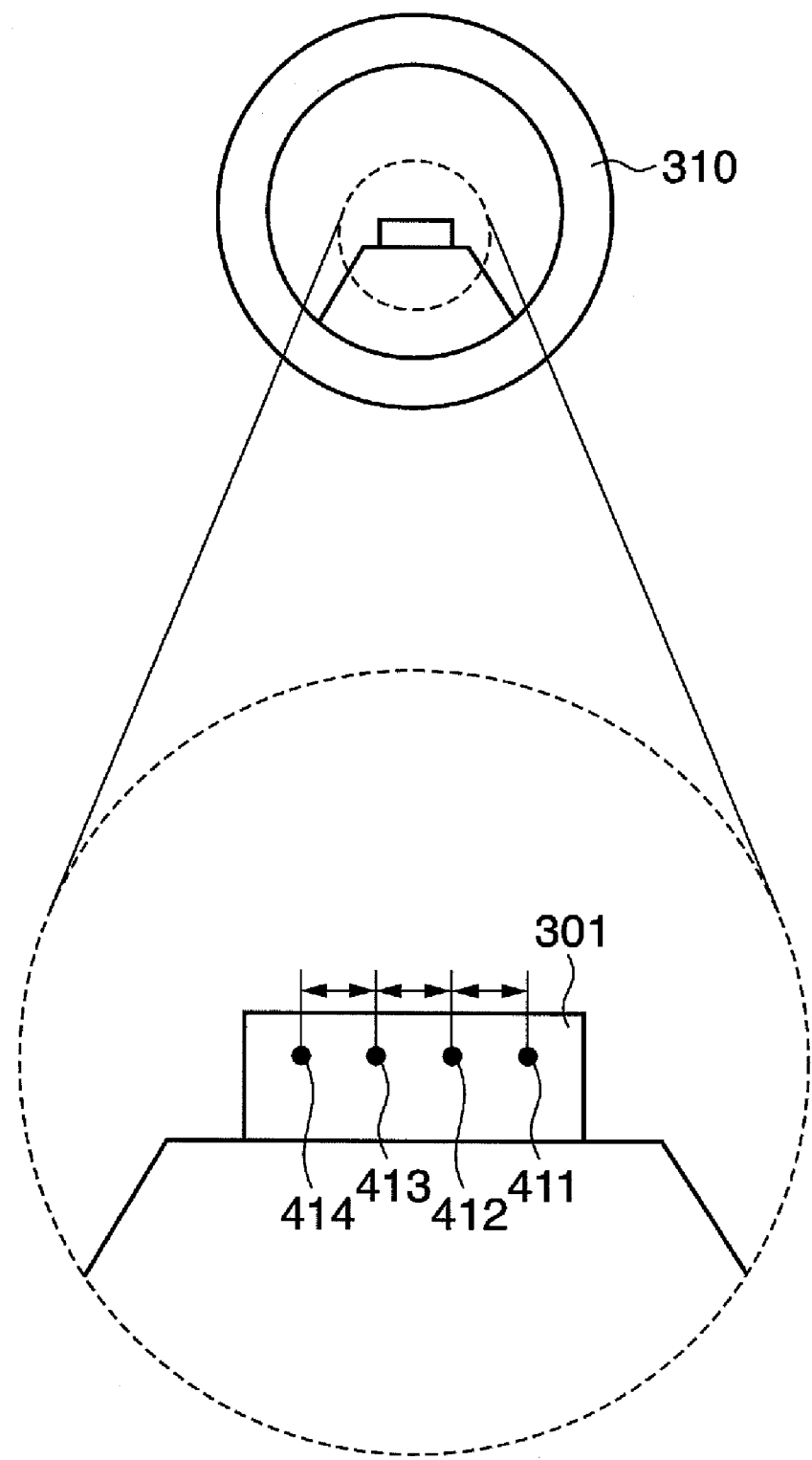
FIG. 4 is a magnified figure of a semiconductor laser according to the execution example given in the current application.

FIG. 4 is a magnified figure of the semiconductor laser source according to the execution example. The semiconductor laser source 301 has four light emitting points 411 to 414. Beams A to D can be simultaneously emitted from these four light emitting points. That is, the semiconductor laser source 301 can form four lines on the photosensitive member drum 111 in one scanning event. For example, when the image forming apparatus 100 provides an image of 1200 dpi, the sub-scanning direction interval among the beams A to D on the photosensitive member is adjusted to 21 μm. The interval among the light emitting points on the semiconductor laser source 301 is 100 μm.

Figure 5:
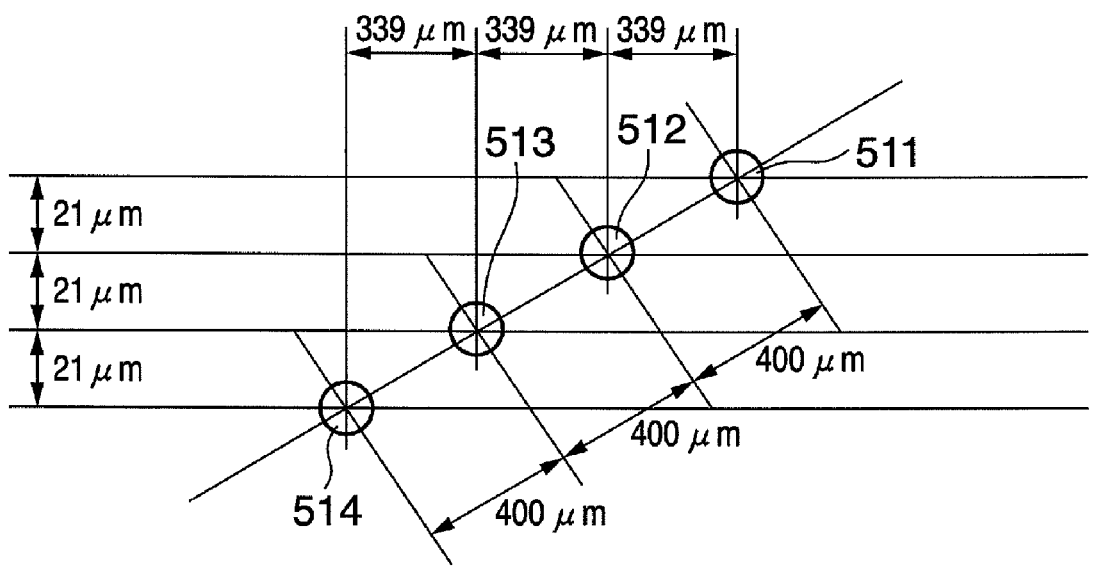
FIG. 5 is a diagram showing an example of beam emission positions according to the execution example.

FIG. 5 is a diagram showing an example of beam emission positions according to the execution example. According to the optical system of this example, the interval among beam spots 511 to 514 formed on the photosensitive member drum 111 is 400 μm, which is four times the interval among the light emitting points. The main scanning direction interval among the beam spots is 399 μm. As stated before, the image writing timing is determined with detection of the beam A by the beam detection unit 308 as a reference. The writing timing of each of the beams B, C and D is determined by delaying by a predetermined period from detection of the beam. For example, the beam scanning speed on the photosensitive member drum 111 is assumed to be 3.99 mm/μs. The beam B starts image forming 100 ns after the timing of image forming by the beam A. The beams C and D start image forming 200 ns and 300 ns after the timing of image forming by the beam A, respectively. In this way, the image forming positions (writing positions) of the beams A, B, C and D in the main scanning direction are aligned.

If all the intervals among the light emitting points are 100 μm as in FIG. 4, the writing timings can be uniformly delayed. Actually, however, misalignment of the light emitting point interval exists due to variation in production of the semiconductor laser source 301. Furthermore, refraction factor difference may occur due to wavelength difference among beams outputted from the semiconductor laser source 301. Since misalignment of the main scanning position is caused by these factors, the spot intervals on the photosensitive member drum 111 are not uniform.

Accordingly, in this example, before the exposure control unit 109, which is the main unit of an optical scanning apparatus, is incorporated in the image forming apparatus 100, multiple beams from the polygon mirror (rotating polygon mirror) 303 are detected, and data concerning main scanning direction misalignment of the multiple beams A to D is calculated. This data is, for example, correction values for correcting misalignment of the writing positions of the respective beams on the photosensitive member drum 111. When correction is performed with the beam A used as a reference, correction values for the beams B, C and D are calculated.

<Calculation of Correction Values for Misalignment of Writing Timing in the Main Scanning Direction>

Figure 6:
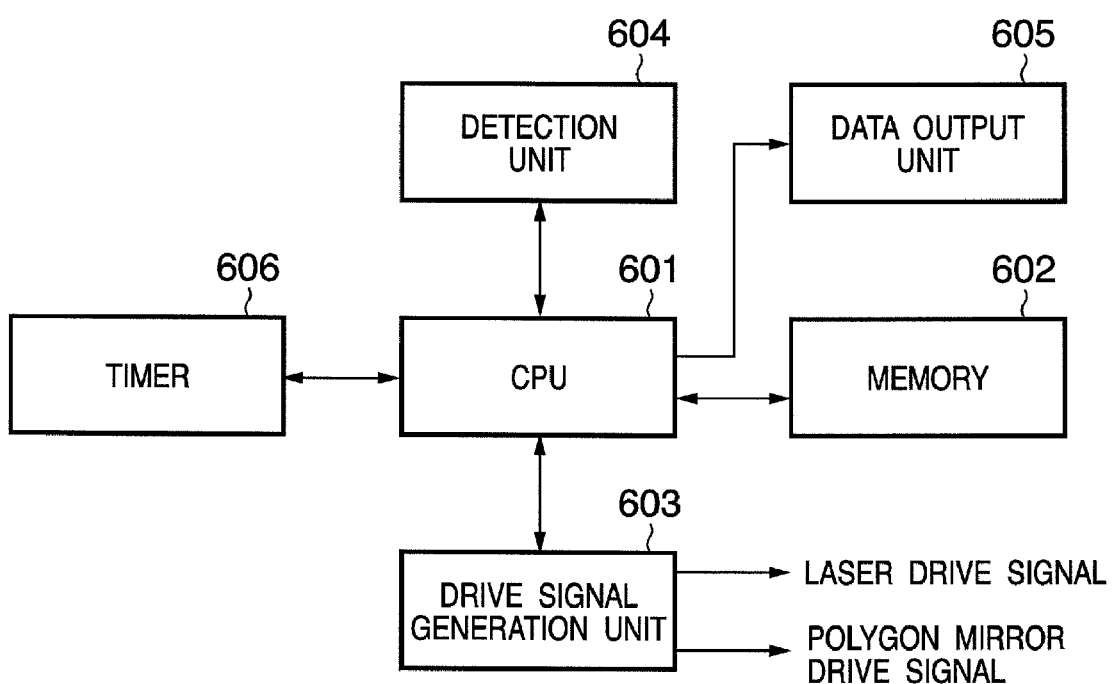
FIG. 6 is an illustrative block diagram of a data calculation apparatus (tool) according to the execution example.

FIG. 6 is an illustrative block diagram of a data calculation apparatus (tool) according to the execution example. A CPU 601 is a control circuit for performing overall control of each unit of the data calculation apparatus. A memory 602 is a storage device such as a RAM and a ROM. A drive signal generation unit 603 is, for example, a drive signal generation unit 603 for sending a laser drive signal to the laser driving unit 309 instead of the main body control unit 200 described above. The drive signal generation unit 603 may send a drive signal for rotating the polygon mirror 303, to the polygon drive motor 304. A detection unit 604 is a detection circuit for detecting a beam from the polygon mirror 303. It is desirable that the detection unit 604 detects a beam which has passed the fθ lens 305 so that influence of the polygon mirror 303 or the fθ lens 305 may be considered. A data output unit 605 outputs data concerning misalignment which has been calculated by the CPU 601 to a holding unit (such as a storage device and a print medium) included in the exposure control unit 109. The process of acquiring the data concerning misalignment is not necessarily required to be a calculation process. The data output unit 605 is, for example, a memory writing circuit, a barcode printer, a display device, a communication interface circuit or the like. A timer 606 is used to measure time.

Figure 7:
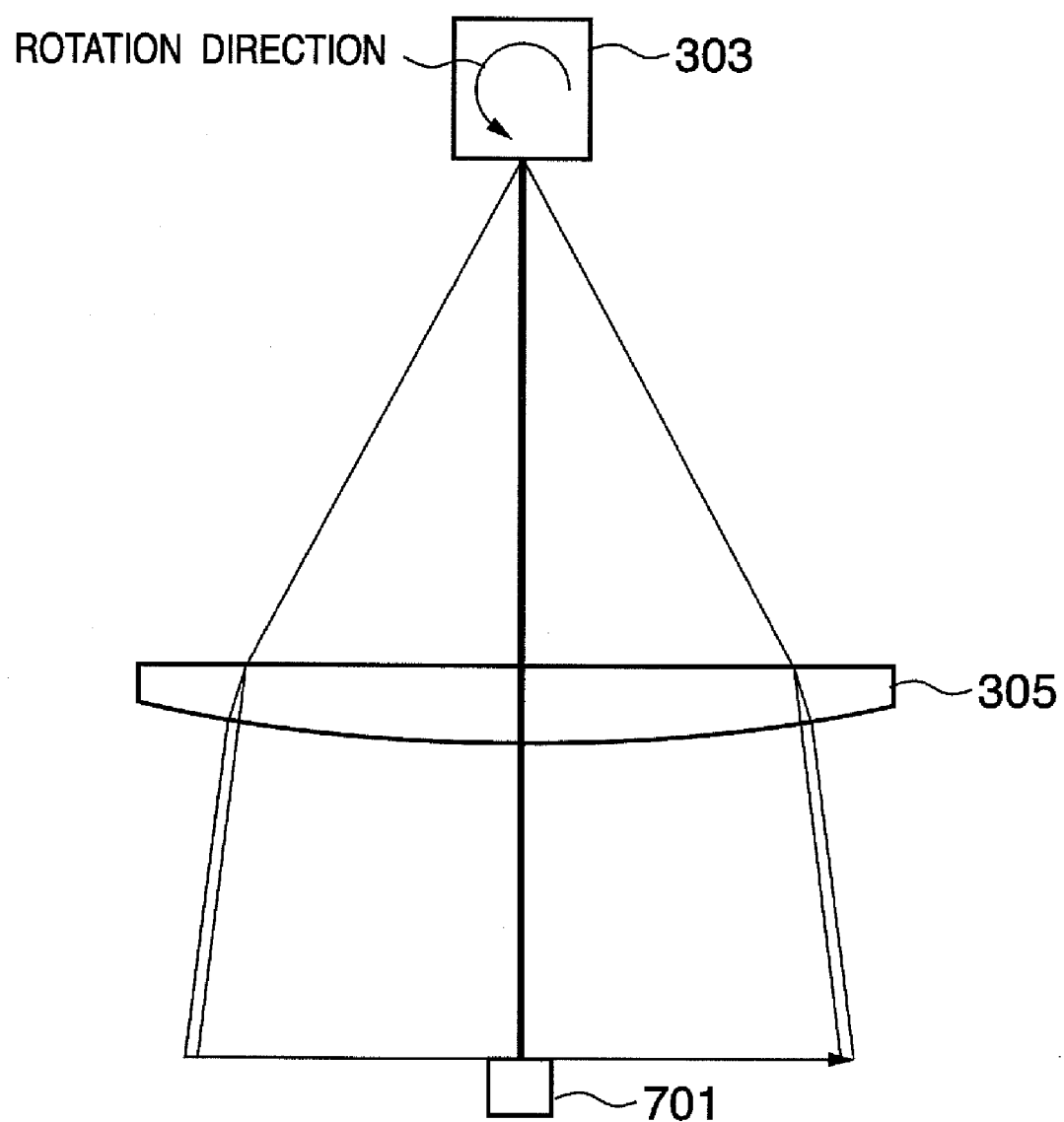
FIG. 7 is a diagram showing that misalignment of a main scanning position is measured according to the execution example.

FIG. 7 is a diagram showing that misalignment of a main scanning position is measured according to the execution example. In a factory, when all adjustment such as optical adjustment and light intensity adjustment ends, the exposure control unit 109 is set in a data calculation apparatus. A photo detector 701 included in the detection unit 604 is arranged on a line which perpendicularly crosses the fθ lens 305 at the center of the lens. This is because the position is a position which is least subject to influence of magnification difference caused due to wavelength difference among beams. This position is called a central image height.

Figure 8:
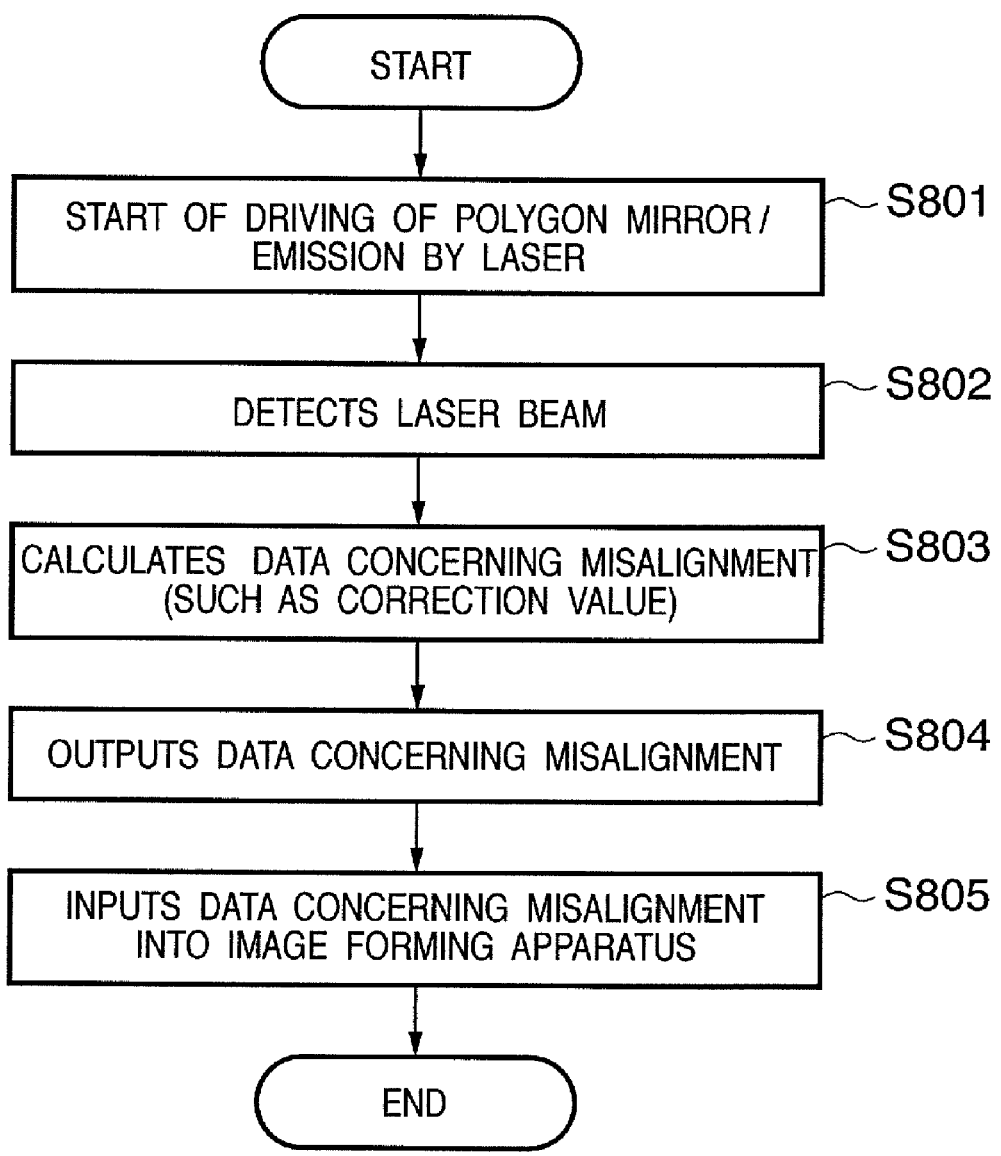
FIG. 8 is an illustrative flowchart showing the process of calculating data concerning misalignment according the execution example.

FIG. 8 is an illustrative flowchart showing the processing for calculating data concerning misalignment according the example. At step S801, the CPU 601 causes the drive signal generation unit 603 to generate a drive signal for driving the polygon mirror 303. The drive signal is provided for the polygon drive motor 304. In this way, the polygon mirror 303 rotates at a predetermined rotation speed. The CPU 601 also causes the drive signal generation unit 603 to generate a drive signal for causing the semiconductor laser source 301 to emit light. Here, the light emitting point 411 (beam A) and the light emitting point 412 (beam B) are lit. In this example, it is necessary to acquire data concerning misalignment before the exposure control unit 109 is incorporated in the image forming apparatus 100, and therefore, the data calculation apparatus provides a signal required to drive the exposure control unit 109.

Figure 9:
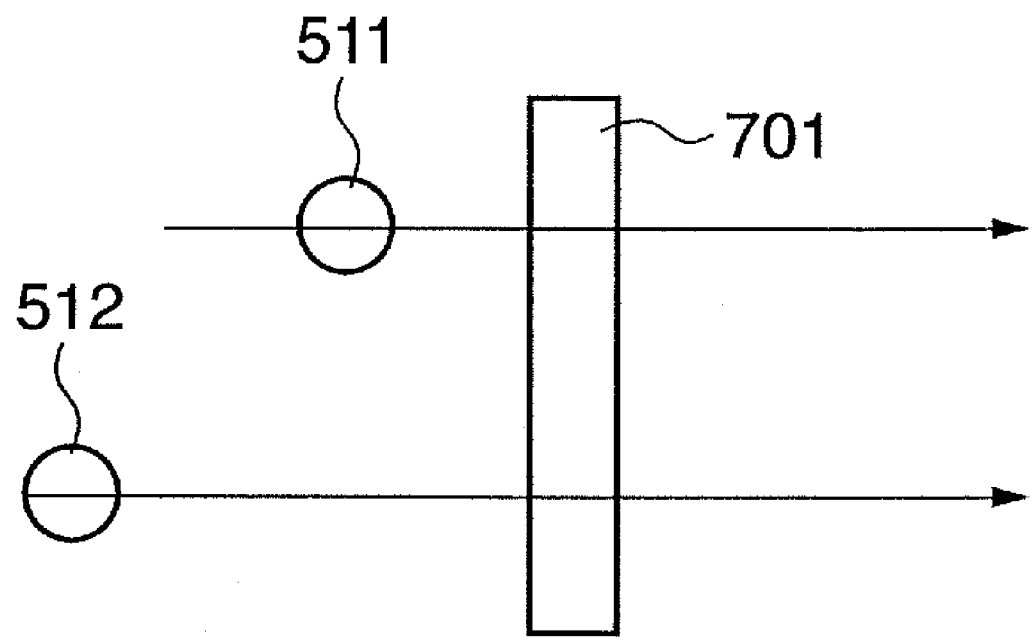
FIG. 9 is a diagram showing the relationship between beam spots and a photo detector according to the execution example.

At step S802, the CPU 601 detects the beams A and B with the use of the photo detector 701 of the detection unit 604. FIG. 9 is a diagram showing the relationship between beam spots and a photo detector according to the execution example. It will be understood that, subsequent to the spot 511 of the beam A, the spot 512 of the beam B passes through the photo detector 701.

Figure 10:
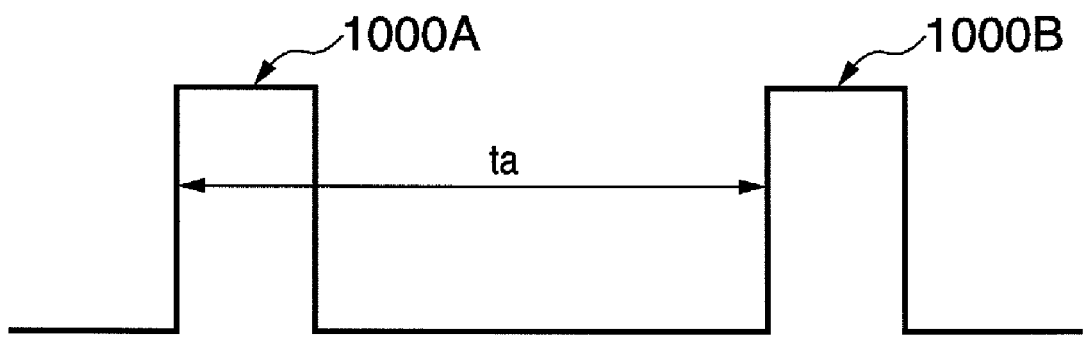
FIG. 10 is a diagram showing an example of an electrical signal outputted from the photo detector according to the execution example.

FIG. 10 is a diagram showing an example of an electrical signal outputted from the photo detector according to the execution example. When the beam A is received, the first peak 1000A is outputted from the photo detector. Subsequently, when the beam B is received, the next peak 1000B is outputted.

At step S803, the CPU 601 calculates data concerning misalignment based on an electrical signal from the detection unit 604. For example, the CPU 601 measures a time period td from the rising edge of an electrical signal about the beam A to the rising edge of an electrical signal about the beam B, with the use of the timer 606. From this time period td, the data concerning misalignment is determined.

Here, the beam scanning speed on the photo detector 701 is assumed to be 3.99 mm/μs. The relative main scanning direction misalignment between the beam A and the beam B is assumed to be 399 μm. The beam scanning speed by an actual machine is assumed to be 3.99 mm/μs. In this case, if the beam B is emitted 100 ns after the timing when the beam A is detected by the beam detection unit 308, the main scanning direction misalignment on the photosensitive member drum 111 is expected not to occur. Therefore, the CPU 601 sets 100 ns as a correction value for the beam B. As for the beams C and D, correction values are calculated by the CPU 601 with the beam A used as a reference. If the scanning speed at measurement and the scanning speed by an actual machine are the same, the measured time period td is to be the data concerning misalignment (correction value).

After that, at step S804, the CPU 601 outputs the data concerning misalignment for the beams B to D. Then, at step S805, the data concerning misalignment is inputted into the image forming apparatus 100.

<Calculation of a Correction Value for Magnification Difference>

Figure 11:
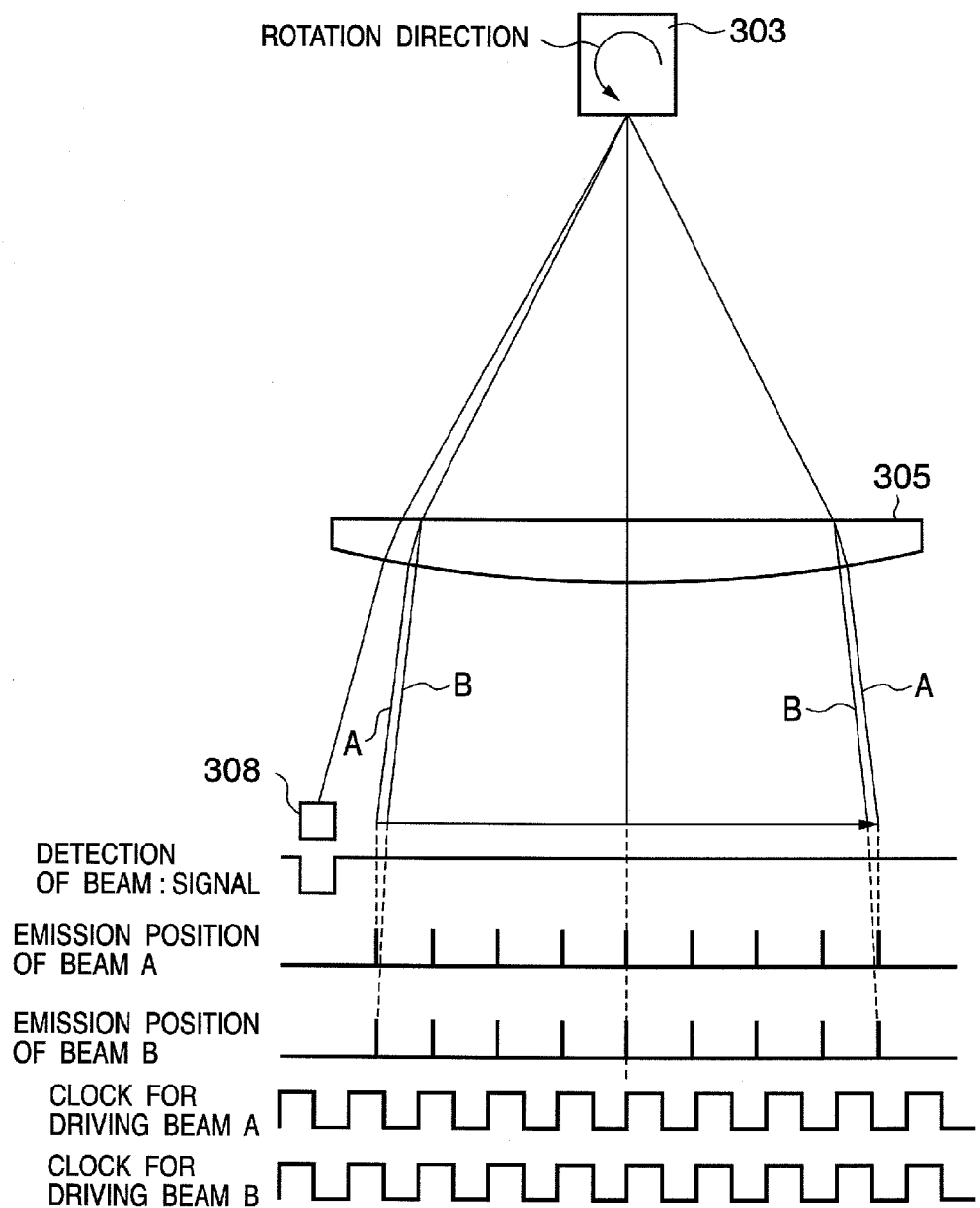
FIG. 11 is a diagram illustrating magnification difference among light emitting points on semiconductor laser according to the execution example.

FIG. 11 is a diagram illustrating magnification difference among light emitting points on a semiconductor laser according to the execution example. In general, the wavelengths of the beams A to D from the multiple light emitting points 411 to 414 may be relatively different due to manufacture accuracy variation of the semiconductor laser source 301. Furthermore, as described above, the refraction factor of various lenses (such as an fθ lens) has wavelength dependence. Therefore, when the beams A to D are emitted onto the photosensitive member drum 111, the main scanning magnifications of the beams A to D are relatively different. Therefore, it is necessary to correct the magnification difference. In FIG. 11, the present invention has not been applied. Accordingly, the frequency (hereinafter referred to as driving frequency) of a clock signal for driving the beam A (the light emitting point 411 of the semiconductor laser source 301) and the driving frequency for the beam B correspond to each other.

Figure 12:
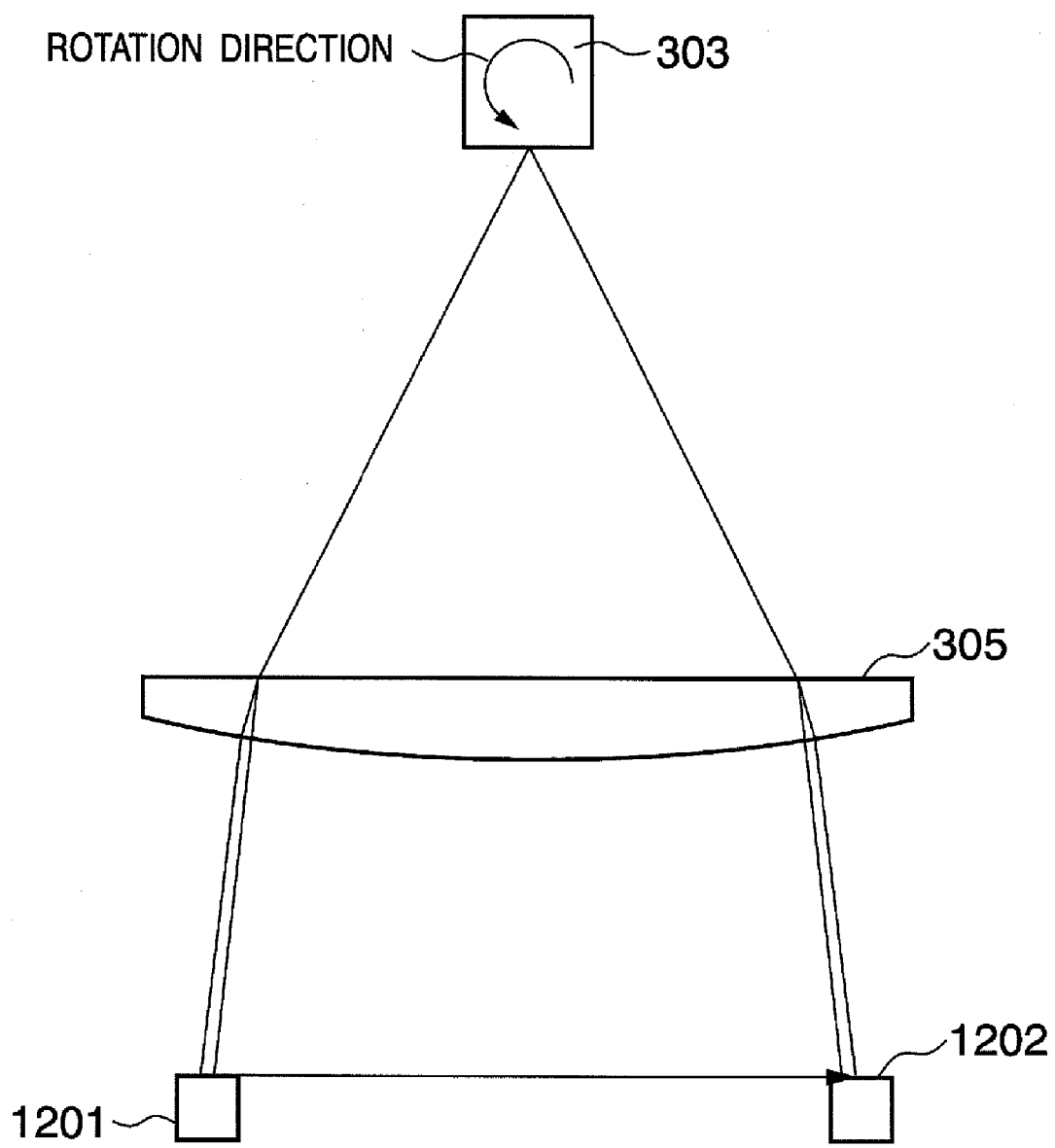
FIG. 12 is a diagram showing the process of measuring magnification difference according to the execution example.

FIG. 12 is a diagram showing that the magnification difference is measured according to the execution example. In this example, in the detection unit 604, photo detectors 1201 and 1202 are arranged at positions corresponding to both ends of the photosensitive member drum 111. The positions at both ends are at an equal distance from the center position of the fθ lens 305. Of course, the photo detector 701 described above may be arranged at the center position.

It is assumed that, as for the exposure control unit 109, adjustment of scanning line slope, optical adjustment such as adjustment for magnification and light intensity adjustment for the beams A to D have been performed in advance. Next, the exposure control unit 109, which is an optical scanning apparatus, is set in the data calculation apparatus.

At step S801, the polygon mirror 303 starts rotation at a predetermined rotation speed. The CPU 601 lights the beam A.

At step S802, the CPU 601 detects the beam with the photo detectors 1201 and 1202 of the detection unit 604. At step S803, the CPU 601 measures the timing when the beam is detected by the photo detector 1201 and the timing when the beam is detected by the photo detector 1202 with the use of the timer 606.

Here, the distance between the photo detector 1201 and the photo detector 1202 is assumed to be 399 mm. The beam scanning speed on the photosensitive member drum 111 is assumed to be 3.99 mm/µs. The measured time periods for the beams A, B, C and D are assumed to be 100 µs, 98 µs, 102 µs and 104 µs, respectively. In this case, the frequency of a clock signal for driving the semiconductor laser source 301 is modulated in order to cause the magnifications of the beams A to D correspond to one another.

For example, the basic driving frequency for the beams A, B, C and D (the semiconductor laser source 301) is assumed to be 50 MHz. The driving frequency for the beam A remains 50 MHz because it is a reference beam. For the other beams, drive frequencies as shown below are set. The reference frequency (the driving frequency for the beam A) is multiplied by the measured time period of the beam to be corrected. Next, the product is divided by the reference measured time period (the measured time period of the beam A). The quotient is obtained as the driving frequency for the beam to be corrected. A more specific example is shown below.

The driving frequency for the beam B:

50×98/100=49 MHz;

the driving frequency for the beam C:

50×102/100=51 MHz; and the driving frequency for the beam D:

50×106/100=53 MHz.

By modulating the drive frequencies in this way, it is possible to cause the magnifications of the beams to correspond to one another.

Figure 13:
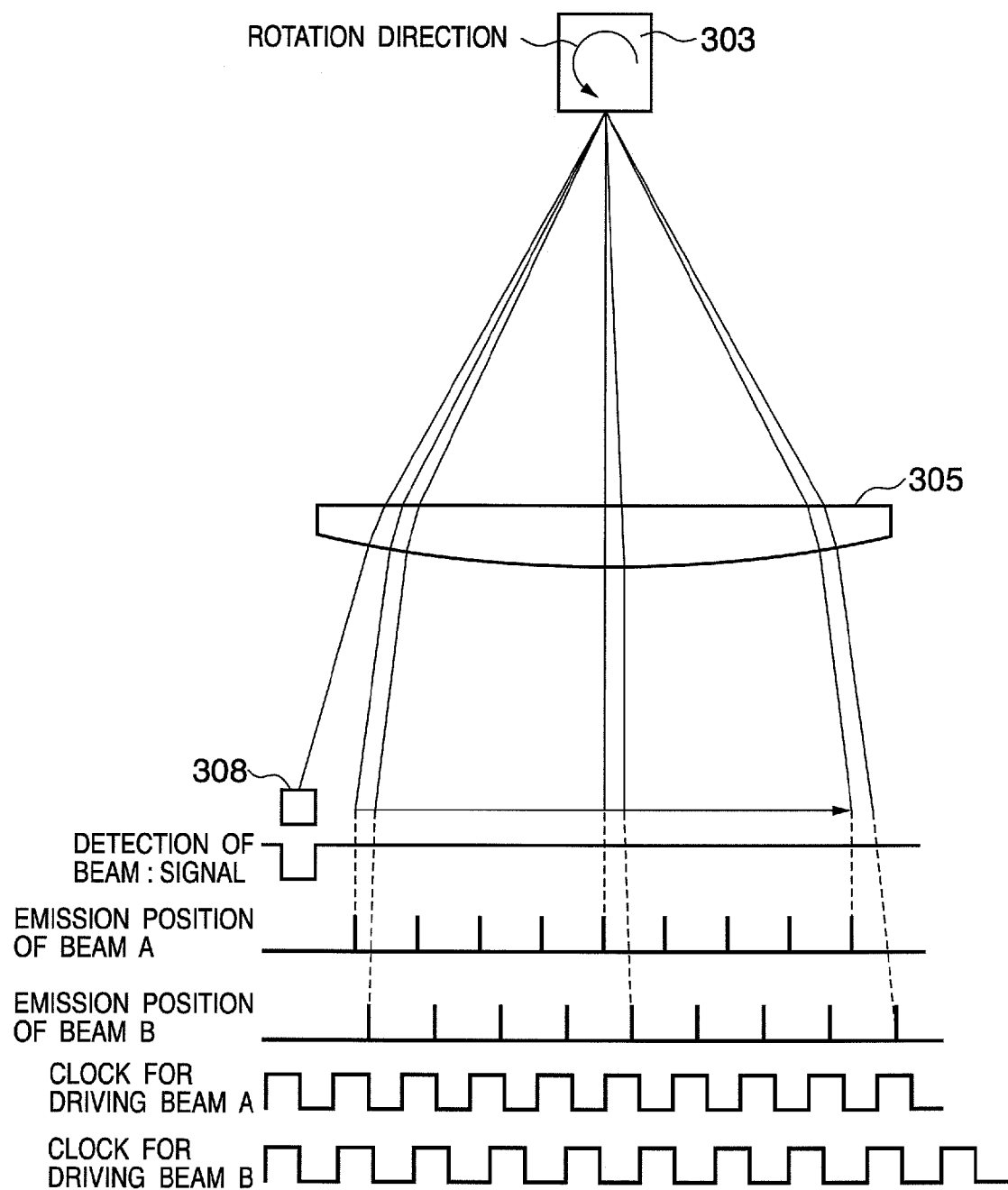
FIG. 13 is a diagram illustrating main scanning direction misalignment caused during magnification adjustment.

FIG. 13 is a diagram illustrating main scanning direction misalignment caused during magnification adjustment. If magnification adjustment is performed as described above, the writing timings for the other beams B to D are misaligned in the main scanning direction relatively to the writing timing of the beam A which is a reference beam. Therefore, it is necessary to correct the misalignment.

Figure 14:
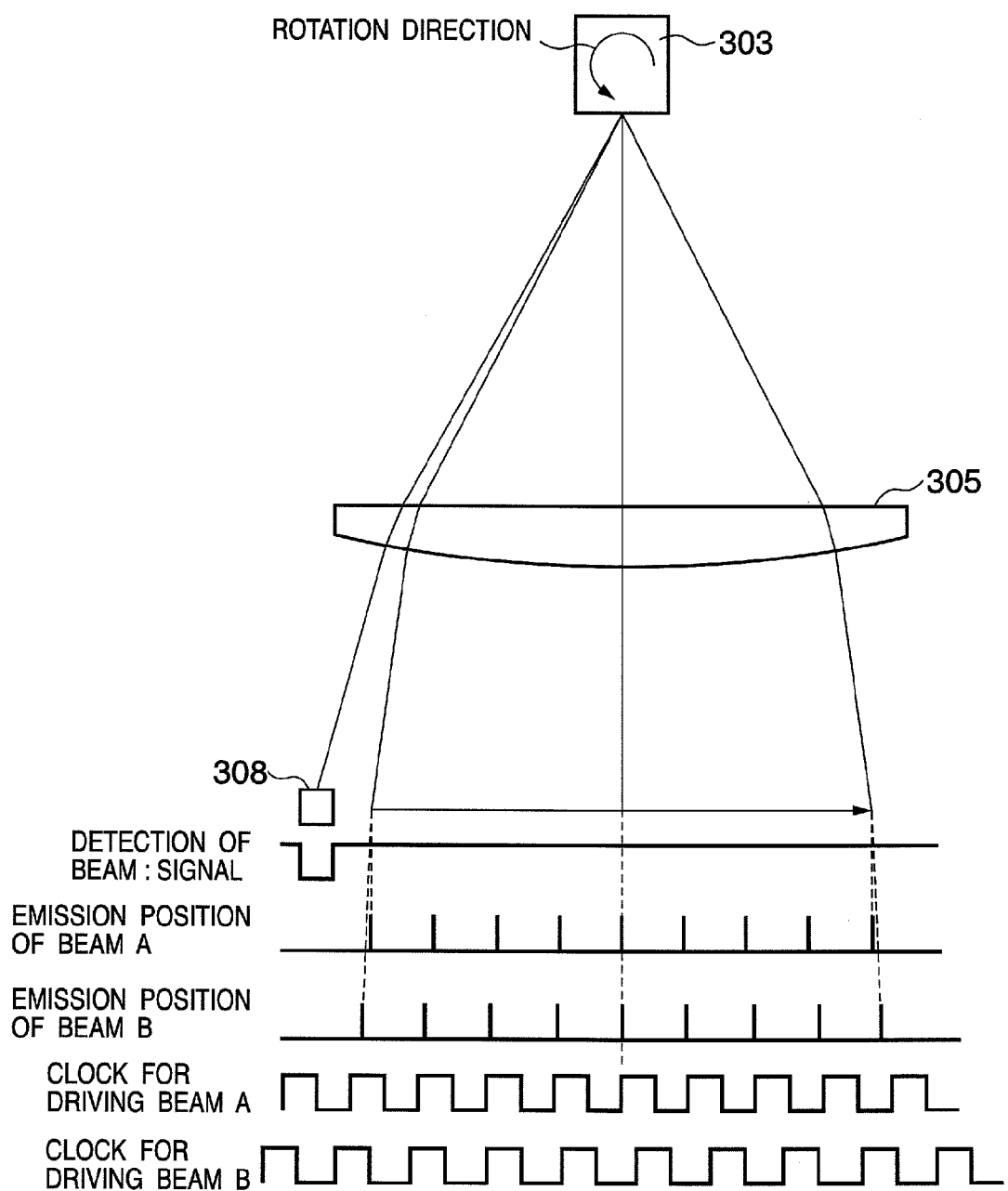
FIG. 14 is a diagram for illustrating the process of correcting main scanning direction misalignment caused during the magnification adjustment according to the execution example.

FIG. 14 is a diagram for illustrating processing for correcting the main scanning direction misalignment caused during the magnification adjustment according to the execution example. As seen from the figure, the misalignment described above is reduced by adjusting the writing timing of each beam in the main scanning direction as appropriate.

At step S803, the CPU 601 calculates data concerning misalignment. For example, the CPU 601 multiplies the time period after detecting a beam with the beam detection unit 308 until the beam is detected by the photo detector 701 arranged at the center position, by an increase/decrease value of the period of the drive clock. Furthermore, the CPU 601 divides the calculated product by the initial drive clock period. The obtained quotient is the correction value for the misalignment.

For example, if the time difference between the timing of detection by the beam detection unit 308 and the timing of detection by the photo detector 701 is 50 µs, the image forming timing of the beam B can be hastened by 1.020 µs. As a result, the image writing timing of the beam B is earlier than the image writing timing of the beam A by 0.995 µs. Thereby, the writing positions of the respective beams on the photosensitive member drum 111 are aligned.

After that, at step S804, the CPU 601 outputs data concerning misalignment of the beams B to D. Then, at step S805, the data concerning misalignment is inputted into the image forming apparatus 100.

<Holding of the Data Concerning Misalignment and Input of the Data into the Image Forming Apparatus>

The steps S804 and S805 described above will be described in more detail. If the data output unit 605 is a memory writing circuit, the data output unit 605 writes the data concerning misalignment in the memory 204. If the data output unit 605 is a barcode printer, a barcode indicating the data concerning misalignment is printed on a label. If the data output unit 605 is a display device, information indicating the data concerning misalignment is displayed. If the data output unit 605 is a communication interface circuit, the data output unit 605 sends the data concerning misalignment to the image forming apparatus 100.

Figure 15:
FIG. 15 is a diagram showing an example of a barcode on which the data concerning misalignment is held according to the execution example.

FIG. 15 is a diagram showing an example of a barcode on which the data concerning misalignment is held according to the execution example. In this example, correction data 1501 to 1056 such as numeric values are also printed on a barcode label together with a barcode 1500.

The writing timing correction data 1501 indicates a numeric value about writing timing misalignment between the beam A and the beam B. The writing timing correction data 1502 indicates a numeric value about writing timing misalignment between the beam A and the beam C. The writing timing correction data 1503 indicates a numeric value about writing timing misalignment between the beam A and the beam D. The magnification correction data 1504 indicates the ratio of magnification between the beam A and the beam B. The magnification correction data 1505 indicates the ratio of magnification between the beam A and the beam C. The magnification correction data 1506 indicates the ratio of magnification between the beam A and the beam D.

If a barcode label on which the barcode 1500 is recorded is attached to the exposure control unit 109 as described above, it is convenient when the exposure control unit 109 is exchanged in the market (for example, in an office). For example, when the figures or alphabets printed out under the barcode 1500 are inputted from the operation unit 219, the main body control unit 200 can store the inputted data in a non-volatile memory. That is, even if a service person does not have a barcode reader, he can input the writing timing correction data 1501 to 1503 or the magnification correction data 1504 to 1506 into the memory on the main body.

The memory 204 of the exposure control unit 109 may be used instead of the barcode 1500. The main body control unit 200 of the image forming apparatus 100 reads the data concerning misalignment stored in the memory 204 via a connection terminal to the exposure control unit 109 when power is on. Furthermore, the main body control unit 200 transfers and stores the data to a main body memory (not shown) which is provided for the main body control unit 200.

As described above, when having inputted the data concerning misalignment, the main body control unit 200 executes light emission control (writing position adjustment or magnification adjustment) for each beam based on the data concerning misalignment stored in the main body memory. For example, the main body control unit 200 modulates a clock signal for each of the light emitting points 411 to 414 of the semiconductor laser source 301 based on the data concerning misalignment.

As described above, according to the present example, before the exposure control unit 109 which is an optical scanning apparatus is incorporated in the image forming apparatus 100, data concerning beam misalignment is measured and held by the exposure control unit 109. Especially, the data concerning misalignment (such as correction values) is measured by a data calculation apparatus, one of the correction tools, at a factory. Therefore, there is an advantage that it is not necessary to provide a mechanism for measuring data concerning misalignment for all image forming apparatuses. Furthermore, since the image forming apparatus 100 does not measure the data concerning misalignment, down time (time while printing is disabled) for measurement can be reduced.

According to this example, data concerning misalignment is measured by the exposure control unit 109 as an almost complete optical scanning apparatus. That is, the data concerning misalignment is acquired in sufficient consideration of errors of optical systems such as the polygon mirror 303 and the fθ lens 305. Therefore, the invention according to this example enables correction of misalignment with a higher accuracy than a conventional system in which a beam from a laser diode to a collimator lens is measured.

The main body control unit 200 of the image forming apparatus 100 in which the exposure control unit 109 is incorporated corrects misalignment with the use of data concerning misalignment which is inputted directly or indirectly from a holding unit. That is, the main body control unit 200 may directly read the data concerning misalignment from the memory 204. The memory 204 may indirectly acquire the data concerning misalignment through the operation unit 219.

The data concerning misalignment includes data for correcting main scanning direction misalignment among the multiple beams A to D on the photosensitive member drum 111. The data concerning misalignment may include, for example, data concerning misalignment of writing positions due to errors of positions where the light emitting points 411 to 414 for the beams A to D are formed. Thereby, it is possible to preferably correct the writing position misalignment in consideration of influence of manufacture errors of the semiconductor laser source 301 in addition to errors of the optical systems such as the polygon mirror 303 and the fθ lens 305.

Furthermore, the data concerning misalignment may include, for example, data for correcting magnification difference due to wavelength difference among the beams A to D. The refraction factor of the polygon mirror 303 or the fθ lens 305 has wavelength dependence. Therefore, it is important to correct magnification difference among the beams A to D caused due to wavelength difference.

As described above, by holding data concerning misalignment in the memory 204 of the exposure control unit 109 or on a barcode label, it is possible to eliminate the troublesome calculation and the measurement mechanism from the image forming apparatus 100. By recording numeric value data or the like indicating the data concerning misalignment on a barcode label, it is possible to indirectly input the data concerning misalignment into an image forming apparatus 100 which is not provided with a barcode reader.

The image forming apparatus 100 is also improved with the improvement of the exposure control unit 109. That is, the image forming apparatus 100 is provided with an input unit for inputting data concerning misalignment from a holding unit mounted on the exposure control unit 109. This input unit may be realized as numeric value keys of the operation unit 219 or a barcode reader, or may be realized as a circuit for reading data from the memory 204. The main body control unit 200 performs light emission control of the power source to reduce the misalignment based on the inputted data concerning misalignment. Since the misalignment is preferably corrected in this way, the image forming apparatus 100 can form an image with a higher quality than an image forming apparatus mounted with a conventional optical scanning apparatus.

For example, the main body control unit 200 can preferably reduce misalignment by modulating clock signals for driving the beams B to D based on magnification correction data included in the data concerning misalignment.

It goes without saying that the data calculation apparatus described above is excellent, and includes the detection unit 604 for detecting the beams A to D which have reached via at least one of the polygon mirror 303 or the fθ lens 305. It is because this apparatus can calculate data concerning misalignment in consideration of influence of optical systems having wavelength dependence.

If the data calculation apparatus is provided with a memory writing circuit or a barcode printer as the data output unit 605, it is easy to hold data concerning misalignment in the exposure control unit 109. The data calculation apparatus may write the data concerning misalignment directly in a non-volatile memory of the image forming apparatus 100 by connecting to the network communication IF unit 215 of the image forming apparatus 100.

In the examples described above, description has been made on the assumption that the data calculation apparatus is provided with the photo detectors 701, 1201 and 1202. However, the detection unit 604 may be provided with a CCD camera. This CCD camera is set at a position corresponding to the photosensitive member drum 111. For each beam spot acquired by the CCD camera, the CPU 601 measures the distance in the main scanning direction. The CPU 601 may calculate writing timing misalignment of the beams B, C and D relative to the beam A, based on the distances.

OTHER EXAMPLES

Various examples have been described in detail. The present invention, however, may be applied to a system configured by multiple pieces of equipment or an apparatus configured by one piece of equipment, for example, a scanner, a printer, a PC, a copying machine, a complex machine and a facsimile apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-255621, filed Sep. 2, 2005, which is hereby incorporated by reference herein in its entirety.

What is claimed is:

1. An optical scanning apparatus to be incorporated in an image forming apparatus, the optical scanning apparatus comprising:
    a light source which emits multiple beams;
    a rotating polygon mirror which rotary-deflects the multiple beams;
    a lens through which the multiple rotary-deflected beams pass; and
    a holding unit which holds data concerning main scanning direction misalignment among the multiple beams on a photosensitive member provided for the image forming apparatus, the data being determined in advance by detecting the multiple beams which have passed the lens before the optical scanning apparatus is incorporated in the image forming apparatus,
    wherein the holding unit is a barcode label, and
    wherein numeric value data indicating the data concerning main scanning direction misalignment is recorded on the barcode label.

2. The optical scanning apparatus according to claim 1, wherein the data concerning main scanning direction misalignment includes data for correcting the main scanning direction misalignment among the multiple beams on the photosensitive member.

3. The optical scanning apparatus according to claim 2, wherein the data concerning main scanning direction misalignment includes data for correcting magnification difference among the multiple beams on the photosensitive body.

4. The optical scanning apparatus according to claim 2, wherein the data concerning main scanning direction misalignment includes data concerning writing position misalignment due to errors of positions where respective light emitting points for the multiple beams are formed.

5. An image forming apparatus comprising:
    an optical scanning apparatus including a light source which emits multiple beams; a rotating polygon mirror which rotary-deflects the multiple beams; a lens through which the multiple rotary-deflected beams pass; and a holding unit which holds data concerning main scanning direction misalignment among the multiple beams on a photosensitive member provided for the image forming apparatus, the data being determined in advance by detecting the multiple beams which have passed the lens before the optical scanning apparatus is incorporated in the image forming apparatus;
    an input unit which inputs the data concerning misalignment from the holding unit mounted on the optical scanning apparatus; and
    a control unit which performs light emission control of the light source based on the inputted data,
    wherein the control unit modulates clock signals for driving the multiple beams based on the magnification data included in the data concerning main scanning direction misalignment.

6. The optical scanning apparatus according to claim 5, wherein the data concerning main scanning direction misalignment includes data for correcting the main scanning direction misalignment among the multiple beams on the photosensitive member.

7. The optical scanning apparatus according to claim 6, wherein the data concerning main scanning direction misalignment includes data for correcting magnification difference among the multiple beams on the photosensitive member.

8. The optical scanning apparatus according to claim 6, wherein the data concerning main scanning direction misalignment includes data concerning writing position misalignment due to errors of positions where respective light emitting points for the multiple beams are formed.

9. An optical scanning apparatus to be incorporated in an image forming apparatus, the optical scanning apparatus comprising:
    a light source which emits multiple beams;
    a rotating polygon mirror which rotary-deflects the multiple beams;
    a lens through which the rotary-deflected multiple beams pass; and
    a holding unit which holding data concerning main scanning direction misalignment among the multiple beams on a photosensitive member provided for the image forming apparatus, the data being determined in advance by detecting the multiple beams which have passed the lens before the optical scanning apparatus is incorporated in the image forming apparatus;
    wherein when the optical scanning apparatus is incorporated in the image forming apparatus, the data concerning main scanning direction misalignment is used by the image forming apparatus to correct the misalignment,
    wherein the holding unit is a barcode label, and
    wherein numeric value data indicating the data concerning misalignment is recorded on the barcode label.

10. The optical scanning apparatus according to claim 9, wherein the data concerning main scanning direction misalignment includes data for correcting the main scanning direction misalignment among the multiple beams on the photosensitive member.

11. The optical scanning apparatus according to claim 10, wherein the data concerning main scanning direction misalignment includes data for correcting magnification difference among the multiple beams on the photosensitive member.

12. The optical scanning apparatus according to claim 10, wherein the data concerning main scanning direction misalignment includes data concerning writing position misalignment due to errors of positions where respective light emitting points for the multiple beams are formed.

13. An image forming apparatus comprising:
    an optical scanning apparatus including a light source which emits multiple beams; a rotating polygon mirror which rotary-deflects the multiple beams; a lens through which the rotary-deflected multiple beams pass; and a holding unit which holding data concerning main scanning direction misalignment among the multiple beams on a photosensitive member provided for the image forming apparatus, the data being determined in advance by detecting the multiple beams which have passed the lens before the optical scanning apparatus is incorporated in the image forming apparatus; wherein when the optical scanning apparatus is incorporated in the image forming apparatus, the data concerning main scanning direction misalignment is used by the image forming apparatus to correct the misalignment;

an input unit which inputs the data concerning misalignment from the holding unit mounted on the optical scanning apparatus; and a control unit which performs light emission control of the light source based on the inputted data, wherein the control unit modulates clock signals for driving the multiple beams based on the magnification data included in the data concerning misalignment.

14. The optical scanning apparatus according to claim 13, wherein the data concerning main scanning direction misalignment includes data for correcting the main scanning direction misalignment among the multiple beams on the photosensitive member.

15. The optical scanning apparatus according to claim 14, wherein the data concerning main scanning direction misalignment includes data for correcting magnification difference among the multiple beams on the photosensitive member.

16. The optical scanning apparatus according to claim 14, wherein the data concerning main scanning direction misalignment includes data concerning writing position misalignment due to errors of positions where respective light emitting points for the multiple beams are formed.

17. A data calculation apparatus comprising:

an optical scanning apparatus including a light source which emits multiple beams; a rotating polygon mirror which rotary-deflects the multiple beams; a lens through which the rotary-deflected multiple beams pass; and a holding unit which holding data concerning main scanning direction misalignment among the multiple beams on a photosensitive member provided for the image forming apparatus, the data being determined in advance by detecting the multiple beams which have passed the lens before the optical scanning apparatus is incorporated in the image forming apparatus; wherein when the optical scanning apparatus is incorporated in the image forming apparatus, the data concerning main scanning direction misalignment is used by the image forming apparatus to correct the misalignment;

a generation unit which generates a drive signal for driving the light source;

a detection unit which detects the multiple beams which have reached via at least one of the rotating polygon mirror and the fθ lens;

a calculation unit which calculates the data concerning misalignment based on an electrical signal outputted from the detection unit; and an output unit which outputs the calculated data concerning misalignment to the holding unit included in the optical scanning apparatus.

18. The optical scanning apparatus according to claim 17, wherein the data concerning main scanning direction misalignment includes data for correcting the main scanning direction misalignment among the multiple beams on the photosensitive member.

19. The optical scanning apparatus according to claim 18, wherein the data concerning main scanning direction misalignment includes data for correcting magnification difference among the multiple beams on the photosensitive member.

20. The optical scanning apparatus according to claim 18, wherein the data concerning main scanning direction misalignment includes data concerning writing position misalignment due to errors of positions where respective light emitting points for the multiple beams are formed.

* * * * *